United States Patent Office 2,864,820
Patented Dec. 16, 1958

2,864,820
ISOTHIOCYANO-S-TRIAZINES

Edward H. Sheers, Flushing, N. Y., and Mary A. Hughes, Shaker Heights, Ohio, assignors to American Cyanamid Company, New York, N. Y., a corporation of Maine No Drawing. Application November 26, 1957
Serial No. 698,912

5 Claims. (Cl. 260—248)

The present invention is concerned with new and useful isothiocyano-s-triazines of the general formula

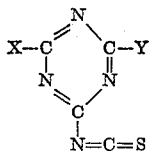

wherein X and Y represent radicals chosen from the group consisting of Cl and N=C=S.

The new triazines are produced by reacting an alkali metal thiocyanate with cyanuric chloride. The reaction proceeds readily when the reactants are brought together in cold water at temperatures of from about 0° to 10° C. The precipitated products are easily separated and purified by conventional procedures such as filtration and washing with cold water.

The following examples illustrate the invention but are not to be construed as limiting the same.

EXAMPLE 1

*Tris(isothiocyano)-s-triazine*

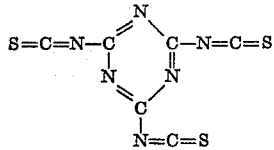

To a suspension of 61 g. of cyanuric chloride in 350 g. of ice-water, there was added with stirring at 0–5° C. an aqueous solution of 125 g. of potassium thiocyanate in 150 g. of water. Stirring was continued for 30 minutes at a temperature of about 5° C. The precipitated product was separated from the reaction mixture by filtration, washed with cold water and dried in vacuo to give 71 g. of a deep orange-colored powder. Infra-red absorption spectra of the product confirmed the assigned structure.

EXAMPLE 2

*2,4-bis(isothiocyano)-6-chloro-s-triazine*

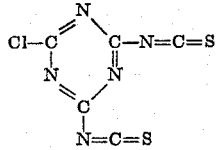

A solution of 81 g. (1 mol) of sodium thiocyanate in water was added with stirring to a suspension of 92 g. (0.5 mol) of cyanuric chloride in ice-water maintained at 0–5° C. The reaction mixture was then stirred for about 45 minutes and held at a temperature of 3–7° C. The precipitated product was filtered off, washed with cold water and dried to give 137 g. of an orange-colored powder.

*Analysis.*—Theory: N, 30.5; C, 26.1; Cl, 15.5. Found: N, 30.5; C, 26.0; Cl, 15.7.

EXAMPLE 3

*2-isothiocyano-4,6-dichloro-s-triazine*

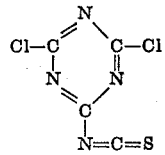

To a suspension of 92 g. (0.5 mol) of cyanuric chloride in 400 g. of ice-water, there was added with stirring at 0–10° C. an aqueous solution of 48.5 g. (0.5 mol) of potassium thiocyanate in 100 g. of water. Stirring was continued for about 30 minutes at a temperature of 5° C. The precipitated product was filtered from the reaction mixture, washed with cold water and dried to give 49 g. of a yellow-colored powder melting at 130–135° C. with decomposition.

*Analysis.*—Theory: N, 27.1; C, 23.2; Cl, 34.3. Found: N, 26.9; C, 23.3; Cl, 34.5.

The isothiocyano-s-triazine compounds of the present invention have been found useful in the agricultural field, particularly as active toxicants for the control of nematodes such as the vinegar eelworm, Anguilla sp., and fungi such as *Sclerotinia fructigena* and *Macrosporium sarcinaeforme*.

An aqueous dispersion of the compound of Example 1 above gives a 100% kill of Anguilla nematodes at a concentration of 0.1%. An aqueous dispersion of the compound of Example 2 above gives a 100% kill of spores of *Sclerotinia fructigena* and *Macrosporium sarcinaeforme* at a concentration of 0.01%. The triazine compounds may be applied as sprays in organic solvents, as emulsions in water or other non-solvents, or on solid carriers such as clays, talcs, diatomaceous earths and the like.

We claim:
1. Isothiocyano-s-triazines having the formula

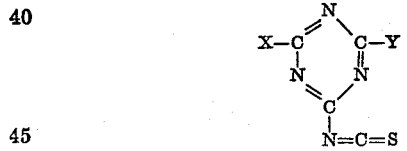

wherein X and Y represent radicals chosen from the group consisting of Cl and N=C=S.
2. Tris(isothiocyano)-s-triazine.
3. 2,4-bis(isothiocyano)-6-chloro-s-triazine.
4. 2-isothiocyano-4,6-dichloro-s-triazine.
5. A method of preparing an isothiocyano-s-triazine of the formula

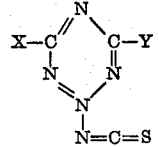

wherein X and Y represent radicals chosen from the group consisting of Cl and N=C=S, which comprises at 0–10° C. suspending cyanuric chloride in water, adding thereto "*n*" mol equivalents of an alkali metal thiocyanate, "*n*" being a small whole number of 1 to 3, "*n*" being one when X and Y are Cl, "*n*" being two when X is Cl and Y is N=C=S, and "*n*" being three when both X and Y are N=C=S, maintaining the mixture at 0–10° C. until reaction ceases, and recovering the thus-formed product.

References Cited in the file of this patent

UNITED STATES PATENTS 2,650,220   Roemer _____ Aug. 25, 1953